（12） United States Patent
Sakata et al.

(10) Patent No.: US 12,524,361 B2
(45) Date of Patent: Jan. 13, 2026

(54) ELECTRONIC APPARATUS AND CONTROL METHOD

(71) Applicant: CANON KABUSHIKI KAISHA, Tokyo (JP)

(72) Inventors: Masaki Sakata, Kanagawa (JP); Mayuko Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/781,377

(22) Filed: Jul. 23, 2024

(65) Prior Publication Data

US 2025/0045226 A1    Feb. 6, 2025

(30) Foreign Application Priority Data

Aug. 3, 2023   (JP) ................... 2023-127324

(51) Int. Cl.
*G06F 13/38*   (2006.01)
*G06F 13/42*   (2006.01)

(52) U.S. Cl.
CPC ........ *G06F 13/382* (2013.01); *G06F 13/4282* (2013.01); *G06F 2213/0042* (2013.01)

(58) Field of Classification Search
CPC ........................... G06F 13/382; G06F 13/4282
USPC ....... 713/1, 2, 100, 300, 310, 320–324, 330, 713/340, 375, 400, 401, 500–503, 600
See application file for complete search history.

(56) References Cited

U.S. PATENT DOCUMENTS

| | | | |
|---|---|---|---|
| 2013/0166928 A1* | 6/2013 | Yang ..................... | G06F 1/3212 713/300 |
| 2015/0100812 A1* | 4/2015 | Jing ....................... | G06F 1/305 713/340 |
| 2023/0028436 A1* | 1/2023 | Reed ................. | H01M 10/4257 |

FOREIGN PATENT DOCUMENTS

JP        2010287017 A      12/2010

* cited by examiner

*Primary Examiner* — Tim T Vo
(74) *Attorney, Agent, or Firm* — Cowan, Liebowitz & Latman, P.C.

(57) ABSTRACT

An electronic apparatus includes a connection unit that connects to a power supply device, and a control unit that controls an operation of the electronic apparatus by power received from the power supply device. When the power supplied from the power supply device is changed based on power consumption of the electronic apparatus, the control unit notifies user for a period until the power supplied from the power supply device is changed.

13 Claims, 6 Drawing Sheets

ELECTRONIC APPARATUS AND CONTROL METHOD

BACKGROUND OF THE INVENTION

Field of the Invention

The present invention relates to a technique for notifying an operation state of an electronic apparatus.

Description of the Related Art

In the Universal Serial Bus (USB) Power Delivery (PD) standard, a power supply device (source device) and a power receiving device (sink device) perform communication for determining power that can be supplied or received based on a power rule including a combination of a voltage value and a current value. The determination of the supply power based on the power rule is executed at the time of connection of the source device and the sink device, and the supply power cannot be changed during the power supply.

In addition, unlike the power supply based on a power rule, a function called programmable power supply (PPS) of the USB PD standard can perform communication (PPS communication) between the source device and the sink device during the power supply and changing power requested to a power supply device from a combination of a plurality of types of voltage values and current values.

As a power supplying method according to the USB PD standard, there is a method for supplying a sufficiently high voltage so that a power receiving device can operate in all operation modes. However, in a power supply circuit such as a DC-DC converter or a switching regulator, the power loss increases as the difference between the input voltage and the output voltage increases, and thus in this power supplying method, the voltage loss increases when the power receiving device is set to an operation mode in which the power receiving device can operate at a voltage lower than the supply voltage. On the other hand, when the power supply device and the power receiving device conform to the PPS, the supply voltage can be changed in accordance with a change in the operation mode of the power receiving device even during power supply, and hence the power loss can be reduced by optimizing the difference between the input voltage and the output voltage even if the operation mode is changed.

However, a transition time is required to change the supply voltage by the PPS of the USB PD standard. For example, when the user performs an operation of changing the operation mode of the power receiving device, time is required for the supply voltage of the power supply device to reach the voltage value required by the power receiving device. If the operation mode of the power receiving device is further changed during the period in which the supply voltage of the power supply device is transitioning as described above, sufficient power cannot be supplied to the power receiving device, and there is a possibility that the operation of the power receiving device is affected.

In order to avoid such an event, it is conceivable to disable the operation of the power receiving device by the user during the period in which the supply voltage of the power supply device is transitioning. In this case, for example, it is conceivable that the screen is grayed out so that the user cannot change the operation mode, but if the screen is only grayed out, the operation of the power receiving device is disabled without the user recognizing the reason why the screen is grayed out, and thus user convenience may deteriorate.

In addition, Japanese Patent Laid-Open No. 2010-287017 describes a technique of notifying a user to confirm whether to shift to a power saving mode in a case where the user does not operate the electronic apparatus for a certain period of time. However, in Japanese Patent Laid-Open No. 2010-287017, the notification is given to the user before the electronic apparatus shifts the operation mode to the power saving mode, and thus the problem in that the convenience deteriorates in the transition period of the supply voltage accompanying the change in the operation mode cannot be solved thereby.

SUMMARY OF THE INVENTION

The present invention has been made in consideration of the aforementioned problems, and realizes techniques for improving user convenience by notifying a user that a supply voltage is being transitioned in a power supply device when power is supplied from the power supply device to the power receiving device.

In order to solve the aforementioned problems, the present invention provides an electronic apparatus comprising: a connection unit that connects to a power supply device; and a control unit that controls an operation of the electronic apparatus by power received from the power supply device; wherein when the power supplied from the power supply device is changed based on power consumption of the electronic apparatus, the control unit notifies user for a period until the power supplied from the power supply device is changed.

In order to solve the aforementioned problems, the present invention provides a method of controlling an electronic apparatus which includes a connection unit that connects to a power supply device, the method comprising: controlling an operation of the electronic apparatus by power received from the power supply device; wherein the controlling includes, when the power supplied from the power supply device is changed based on the power consumption of the electronic apparatus, notifying user for a period until the power supplied from the power supply device is changed.

According to the present invention, in a case where power is supplied from the power supply device to the power receiving device, user convenience can be improved by notifying the user that the supply voltage is being transitioned in the power supply device.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

In the present embodiment, in a case where power is supplied from the power supply device to the power receiving device, notification is given to the user that the supply voltage is being transitioned in the power supply device during a period in which the supply voltage of the power supply device transitions by change in the operation mode of the power receiving device, thereby improving the convenience of the user.

First Embodiment

Next, a first embodiment will be described with reference to FIGS. 1 to 3.

First, hardware configuration of a power supply device and a power receiving device according to the first embodiment will be described with reference to FIG. 1.

In the present embodiment, a power supply device 100 and a power receiving device 150 conform to the USB PD standard, and power supplied from the power supply device 100 to the power receiving device 150 can be changed by the PPS.

The power supply device 100 is, for example, a charger or a mobile battery complying with the USB PD standard. The power receiving device 150 is an electronic apparatus such as a personal computer (PC), a tablet PC, or a smartphone complying with the USB PD standard.

The power supply device 100 includes an information obtaining unit 101 and a connection unit 102. The information obtaining unit 101 performs communication for determining supply power with the information obtaining unit 154 of the power receiving device 150. The connection unit 102 is connected to the connection unit 152 of the power receiving device 150 so as to be able to communicate therewith, and realizes transmission and reception of information between the information obtaining unit 101 and the information obtaining unit 154. The information obtaining unit 101 determines the supply power of the power receiving device 150 based on a current value and a voltage value requested from the information obtaining unit 154 of the power receiving device 150. In the present embodiment, the information obtaining unit 101 and the information obtaining unit 154 include a power delivery (PD) controller. The PD controller communicates with another PD controller and determines a setting related to the supply power. For example, the PD controller determines a role of the power supply and determines the supply power.

In the power receiving device 150, a microcomputer 151*a* executes a control program such as firmware to control the operation of each component of the power receiving device 150.

The microcomputer 151*a* includes, for example, a CPU, a ROM, a RAM, an input/output control circuit (I/O control circuit), a multiplexer, a timer circuit, an RRPEOM, an A/D converter, and a D/A converter, and is configured as a single microcomputer built-in type IC chip.

The microcomputer 151*a* controls the operation of the power receiving device 150 based on input information from an operation unit 155 provided in the power receiving device 150. The operation unit 155 is a touch panel, a switch, a button, a dial, a joystick, or the like.

A notification unit 156 gives a state transition notification during the transition of the supply voltage based on the notification control information from the microcomputer 151*a*. The notification unit 156 is a display panel integrated with the touch panel, a peeping type finder, an LED, or the like.

A voltage detection unit 153*a* detects a voltage value of the power supplied from the power supply device 100. Furthermore, the voltage detection unit 153*a* compares the voltage value supplied from the power supply device 100 with the voltage threshold output from the microcomputer 151*a*. The voltage detection unit 153*a* is configured by a hardware circuit such as a comparator, but may be realized by software processing of the microcomputer 151*a*.

Next, a functional configuration of the microcomputer 151*a* of the power receiving device 150 according to the first embodiment will be described with reference to FIG. 2.

Each function of the microcomputer 151*a* is configured by hardware and/or software. Note that when each functional unit of the microcomputer 151*a* illustrated in FIG. 2 is configured by hardware instead of being realized by software, circuit configuration corresponding to each functional unit in FIG. 2 may be provided.

When the operation mode of the power receiving device 150 is changed based on the operation mode set by the user via the operation unit 155, the operation control unit 204 outputs mode information regarding the changed operation mode to a power consumption determination unit 202.

The power consumption determination unit 202 compares the power information related to the power consumption of the power receiving device 150 before and after the change of the operation mode based on the mode information, and determines the presence or absence of change in the operation mode. In the present embodiment, the power information is stored in a memory such as a ROM, and is information including a combination of a current value and a voltage value. The power consumption determination unit 202 obtains power information associated with the operation mode of the power receiving device 150 based on the mode information obtained from the operation control unit 204. The power consumption determination unit 202 calculates the product of the current value and the voltage value before and after the change of the operation mode, and compares the calculation results to determine the presence or absence of change in the power consumption.

Furthermore, when determined that the operation mode is changed based on the mode information, the power consumption determination unit 202 obtains the voltage threshold. In the present embodiment, the voltage threshold is stored in a memory such as a ROM. The power consumption determination unit 202 obtains the voltage threshold associated with the operation mode based on the mode information. The voltage threshold is a minimum voltage value at which the power receiving device 150 can operate without abnormality in the operation mode associated with the voltage threshold.

The notification control unit 203a controls the notification unit 156 based on the determination result of the power consumption determination unit 202. In addition, the notification control unit 203a controls the notification unit 156 based on the detection result of the voltage detection unit 153a.

The mode setting unit 201 controls the change in the operation mode based on the determination result of the power consumption determination unit 202. In addition, the mode setting unit 201 controls the change in the operation mode based on the detection result of the voltage detection unit 153a.

Next, control process of the first embodiment will be described with reference to FIG. 3.

Figure 3:
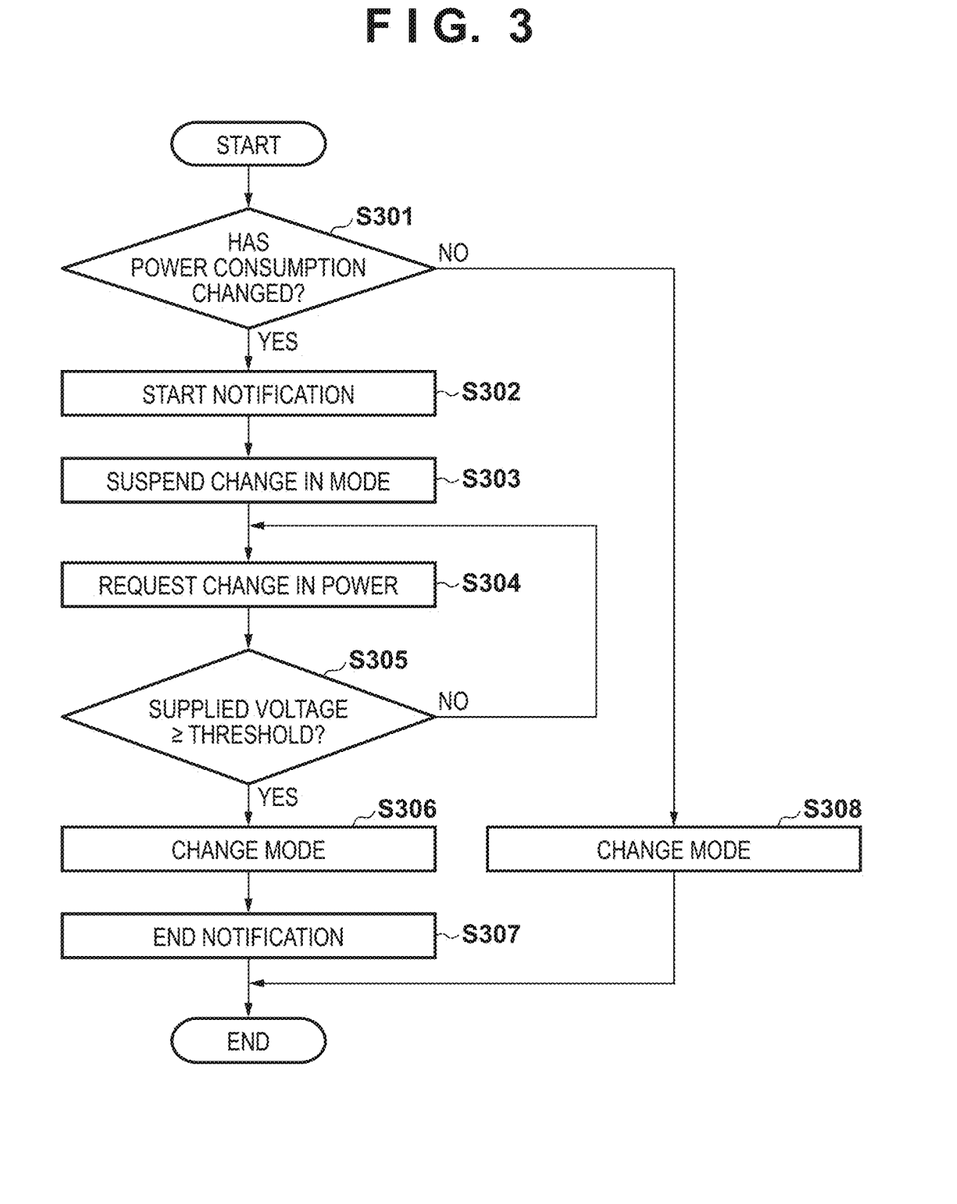
FIG. 3 is a flowchart illustrating control process of the power receiving device according to the first embodiment.

FIG. 3 is a flowchart illustrating a process of performing a state transition notification in a period in which the supply voltage of the power supply device 100 is transitioning after the user performs the operation of changing the operation mode by the operation unit 155.

The process of FIG. 3 is realized by the microcomputer 151a executing a control program such as firmware stored in a memory such as a ROM and controlling the operation of each component of the power receiving device 150.

In step S301, the power consumption determination unit 202 compares the power consumption information of the power receiving device 150 before and after the change in the operation mode based on the mode information, and determines the presence or absence of change in the power consumption. The power consumption determination unit 202 outputs the determination result to the notification control unit 203 and the mode setting unit 201. In addition, the power consumption determination unit 202 outputs the current value and the voltage value to the information obtaining unit 154. Furthermore, the power consumption determination unit 202 outputs a voltage threshold to the voltage detection unit 153a.

When the power consumption determination unit 202 determines that there is a change in the power consumption of the power receiving device 150 based on the mode information, the process proceeds to step S302. When the power consumption determination unit 202 determines that there is no change in the power consumption of the power receiving device 150 based on the operation mode information, the process proceeds to step S308.

In step S302, the notification control unit 203 outputs the notification control information to the notification unit 156. The notification unit 156 starts state transition notification indicating that the supply voltage of the power supply device 100 is transitioning based on the notification control information.

Note that in the present embodiment, the state transition notification is given when the power consumption of the power receiving device 150 increases in step S301, and the operation mode of the power receiving device 150 is changed in step S308 without giving the state transition notification when the power consumption of the power receiving device 150 does not increase or decreases.

In step S303, the mode setting unit 201 suspends the change in the operation mode.

In step S304, the information obtaining unit 154 requests the power supply device 100 to change the supply power based on the current value and the voltage value of after the change in the operation mode.

In step S305, the voltage detection unit 153a compares the supply voltage value of the power supply device 100 with the voltage threshold, and determines whether or not the supply voltage value has reached the voltage threshold.

When determining that the supply voltage value has reached the voltage threshold, the voltage detection unit 153a outputs the determination result to the mode setting unit 201 and the notification control unit 203.

When the voltage detection unit 153a detects that the supply voltage value has reached the voltage threshold, the process proceeds to step S306. When the voltage detection unit 153a does not detect that the supply voltage value has reached the voltage threshold, the process is returned to step S304, and the comparison between the supply voltage value and the voltage threshold is continued.

In step S306, the mode setting unit 201 changes the operation mode in accordance with the supply voltage value of the power supply device 100 reaching the voltage threshold and the end of the transition period of the supply voltage.

In step S307, the notification control unit 203 outputs the notification control information to the notification unit 156 in accordance with the end of the transition period of the supply voltage. The notification unit 156 ends the state transition notification based on the notification control information.

In step S308, the mode setting unit 201 changes the operation mode.

As described above, according to the first embodiment, when the operation mode of the power receiving device 150 is changed, the change in the operation mode is suspended until the transition period of the supply voltage due to the change in the power consumption of the power receiving device 150 ends, and the state transition notification is given during the transition of the supply voltage of the power supply device. As a result, the user can recognize the reason why the operation of the power receiving device 150 is disabled after performing the operation of changing the operation mode, and the convenience can be improved.

Second Embodiment

Next, a second embodiment will be described.

Figure 1:
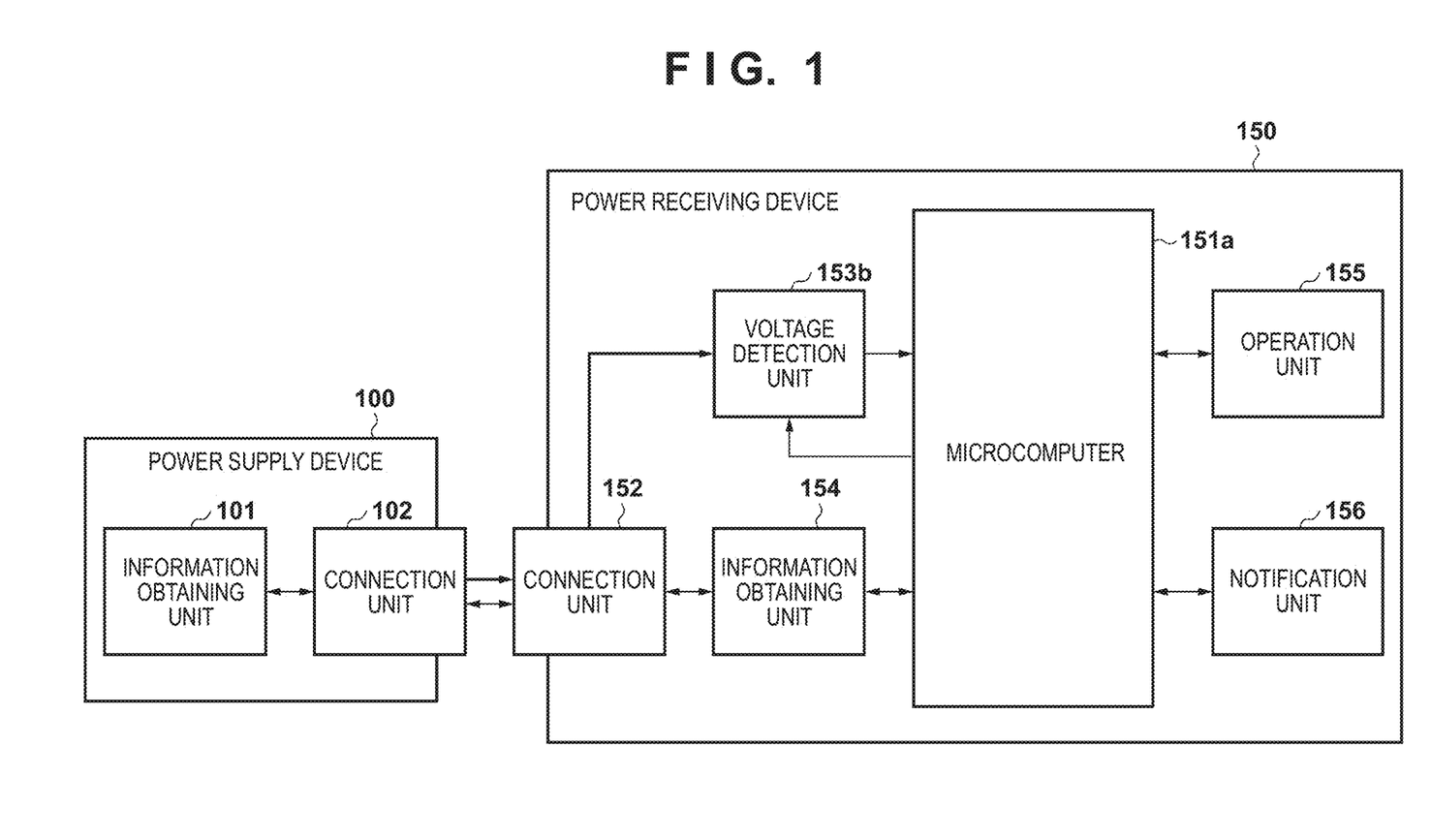
FIG. 1 is a block diagram illustrating a configuration of a power supply device and a power receiving device according to the present embodiment.
Figure 2:
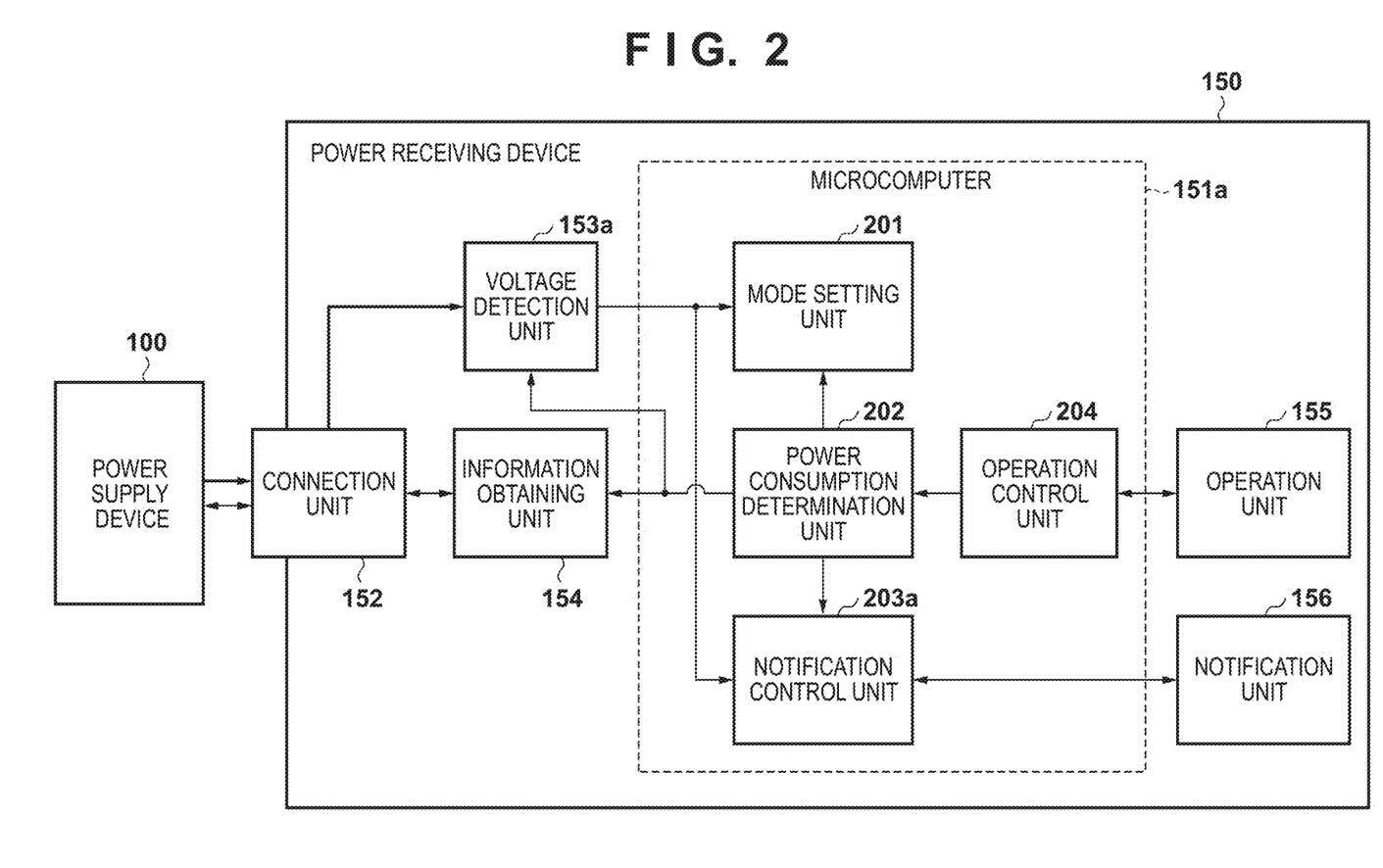
FIG. 2 is a block diagram illustrating a configuration of a power receiving device according to a first embodiment.

The configuration of the power supply device 100 of the second embodiment is similar to that of FIG. 1 of the first embodiment.

Figure 4:
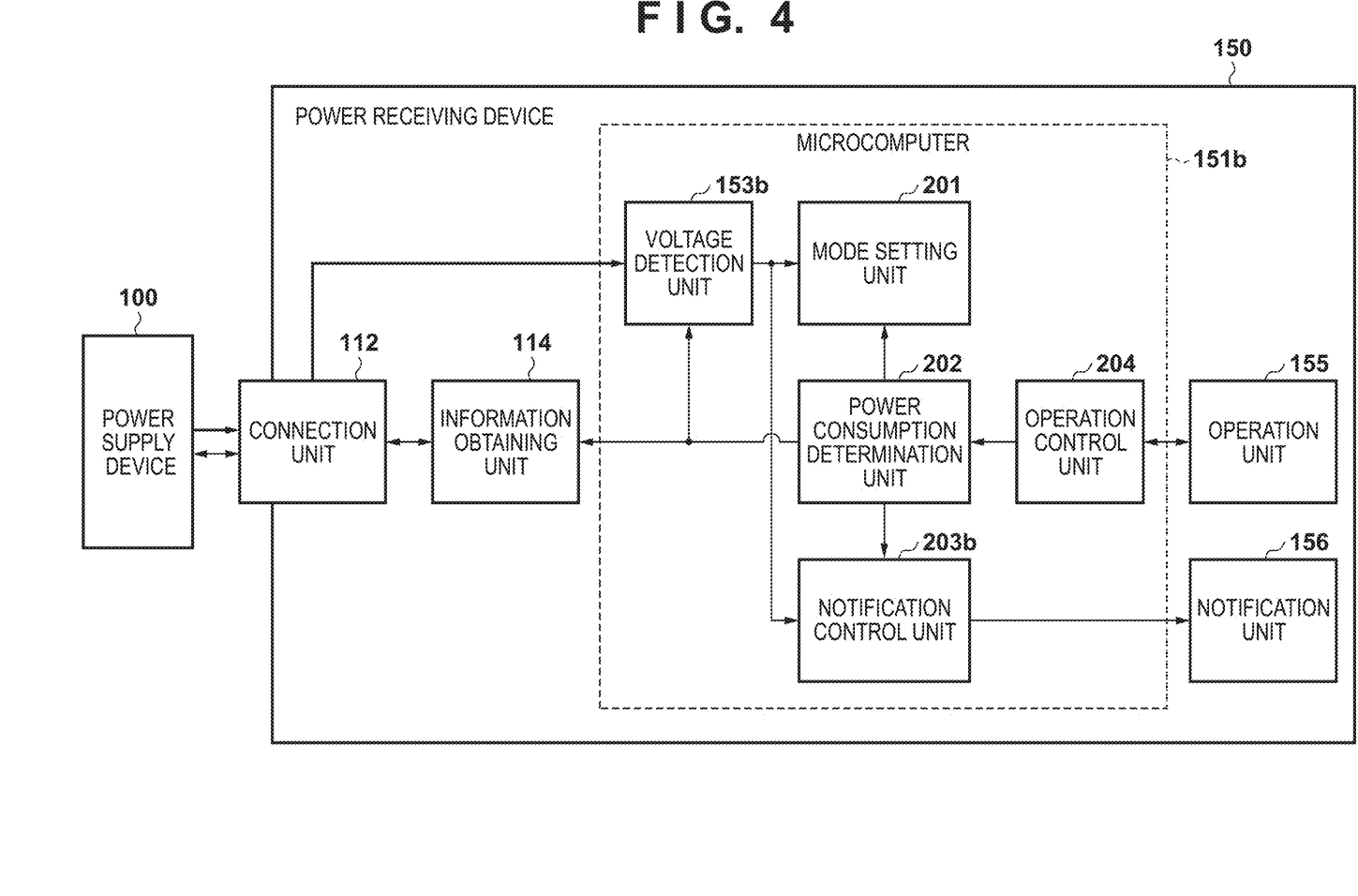
FIG. 4 is a block diagram illustrating a configuration of a power receiving device according to a second embodiment.

First, a configuration of a power receiving device 150 according to the second embodiment will be described with reference to FIG. 4.

In the power receiving device 150 of the second embodiment, a microcomputer 151b includes a voltage detection unit 153b, functions of the voltage detection unit 153b and the notification control unit 203b are different from those of the first embodiment, and other configurations and functions are similar to those of the first embodiment.

Since the power receiving device 150 of the first embodiment does not have a function of notifying the duration of the state transition notification, the user cannot know the remaining time until the transition period of the supply voltage due to the change in the power consumption of the power receiving device 150 ends and the change in the operation mode is completed, and there is room for improvement in convenience.

On the other hand, in the power receiving device 150 of the second embodiment, the voltage detection unit 153b has a function of calculating the transition time of the supply voltage. The calculation function of the transition time by the voltage detection unit 153b is realized by software processing by the microcomputer 151b. The voltage detection unit 153b calculates the transition time of the supply voltage based on the information of the time held in the memory such as the ROM and the information of the supply voltage value.

The notification control unit 203b notifies the duration of the state transition notification based on the transition time calculated by the voltage detection unit 153b. As a result, the user can know the remaining time until the change in the operation mode is completed, so that convenience can be improved.

Next, control process of the second embodiment will be described with reference to FIG. 5.

Figure 5:
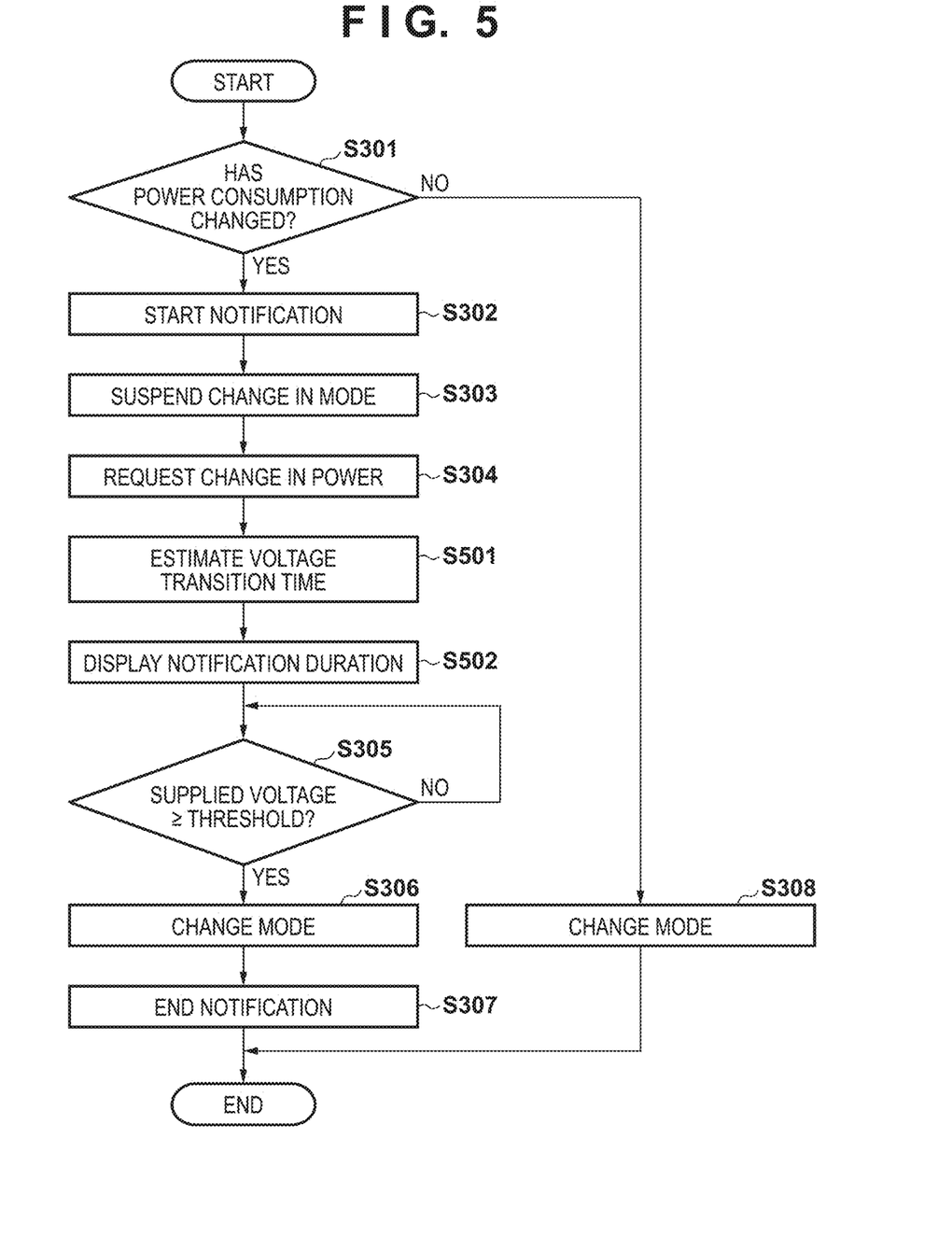
FIG. 5 is a flowchart illustrating control process of the power receiving device according to the second embodiment.

FIG. 5 is a flowchart illustrating a process of performing a state transition notification in a period in which the supply voltage of the power supply device 100 is transitioning after the user performs the operation of changing the operation mode by the operation unit 155.

The process of FIG. 5 is realized by the microcomputer 151b executing a control program such as firmware stored in a memory such as a ROM and controlling the operation of each component of the power receiving device 150.

The processes in steps S301 to S304 are similar to those in FIG. 3.

In step S501, the voltage detection unit 153b calculates the duration of the state transition notification and outputs the duration to the notification control unit 203b. The notification control unit 203b outputs the notification control information to the notification unit 156 based on the duration of the state transition notification.

In step S502, the notification unit 156 starts the state transition notification including the fact that the supply voltage is transitioning and the duration of the state transition notification based on the notification control information.

Figure 6:
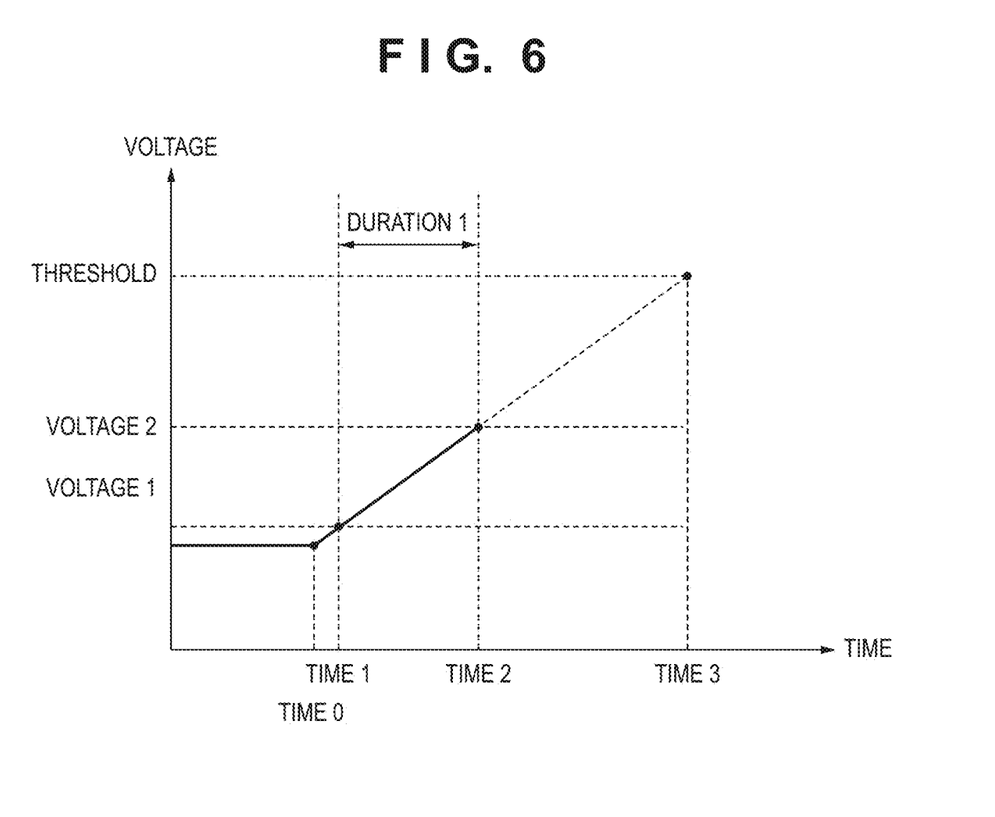
FIG. 6 is a diagram explaining a method for calculating a duration of a state transition notification according to the second embodiment.

Next, a method for calculating the duration of the state transition notification will be described with reference to FIG. 6.

Time 0 is a time at which the supply voltage started to transition. Time 1 is a time immediately after the supply voltage transitioned, and the supply voltage value obtained by the voltage detection unit 153b at time 1 is set as voltage 1. Time 2 is a time when period 1 has elapsed from time 1, and the supply voltage value obtained by voltage detection unit 153b at time 2 is set as voltage 2. Time 3 is an estimated time at which the supply voltage value reaches the voltage threshold.

In the second embodiment, the period 1 is determined based on the standard value of the USB PD standard. A method for determining the period 1 will be described. According to the USB PD standard, when the supply voltage is changed by the PPS, the range of the supply voltage value that can be changed by one communication is defined to be 20 mV to 500 mV. Furthermore, the range of the transition time of the supply voltage in one communication is defined to be 25 ms to 275 ms. From these definitions, the transition time of the supply voltage is minimized when the voltage change is completed at one time and the transition time is 25 ms, which is the minimum. Therefore, period 1 is determined to be a period sufficiently shorter than 25 ms.

The voltage detection unit 153b obtains the voltage 1 V_t1 and the voltage 2 V_t2 at time 1 t1 and time 2 t2 after the supply voltage of the power supply device 100 has started to transition. Time 3 t3 at which the supply voltage reaches the voltage threshold VREF is calculated by the following Equation 1. Since the duration t4 of the state transition notification is a time from time 2 to time 3 at which the supply voltage value is obtained last, the duration t4 is calculated by the following Equation 2.

$$t3 = \{(VREF - V\_t1)/(V\_t1 - V\_t2)\} \times (t1 - t2) \qquad \text{(Equation 1)}$$

$$t4 = t3 - t2 \qquad \text{(Equation 2)}$$

The notification control unit 203b outputs the notification control information to the notification unit 156 based on the duration calculated by the above Equation 2, whereby the notification unit 156 gives the state transition notification including the fact that the supply voltage of the power supply device 100 is transitioning and the duration of the state transition notification.

As described above, according to the second embodiment, convenience can be further improved as compared with the first embodiment by notifying the user of the duration of the state transition notification in addition to the fact that the supply voltage is transitioning.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-127324, filed Aug. 3, 2023 which is hereby incorporated by reference herein in its entirety.

What is claimed is:

1. An electronic apparatus comprising:
   a connection unit that connects to a power supply device; and
   a control unit that controls an operation of the electronic apparatus by power received from the power supply device; wherein
   when the power supplied from the power supply device is changed based on power consumption of the electronic apparatus, the control unit notifies user for a period until the power supplied from the power supply device is changed, and wherein the control unit suspends change in an operation mode of the electronic apparatus until the power supplied from the power supply device is changed based on the power consumption of the electronic apparatus changed in accordance with the operation mode of the electronic apparatus, and gives the notification until the power supplied from the electronic apparatus is changed.

2. The apparatus according to claim 1, wherein the control unit requests change in power supplied from the power supply device based on the power consumption of the electronic apparatus changed in accordance with the operation mode of the electronic apparatus.

3. The apparatus according to claim 1, wherein the control unit gives the notification when power consumption of the electronic apparatus increases, and changes the operation mode of the electronic apparatus without giving the notification when power consumption of the electronic apparatus does not increase.

4. The apparatus according to claim 1, wherein the connection unit is an interface complying with a universal serial bus (USB) power delivery (PD) standard, and the electronic apparatus can communicate with the power supply device by programmable power supply (PPS) of the USB PD standard.

5. The apparatus according to claim 2, wherein the control unit estimates a time until a voltage of the power supplied from the power supply device transitions to a predetermined voltage after requesting the power supply device to change the power supplied from the power supply device, and displays a duration of the notification.

6. The apparatus according to claim 2, wherein the control unit ends the notification when a voltage of the power supplied from the power supply device reaches a predetermined voltage after requesting the power supply device to change the power supplied from the power supply device.

7. A method of controlling an electronic apparatus which includes a connection unit that connects to a power supply device, the method comprising:

controlling an operation of the electronic apparatus by power received from the power supply device; wherein the controlling includes, when the power supplied from the power supply device is changed based on the power consumption of the electronic apparatus, notifying user for a period until the power supplied from the power supply device is changed, and the controlling includes suspending change in an operation mode of the electronic apparatus until the power supplied from the power supply device is changed based on the power consumption of the electronic apparatus changed in accordance with the operation mode of the electronic apparatus, and giving the notification until the power supplied from the electronic apparatus is changed.

8. The method according to claim 7, wherein the controlling includes requesting change in power supplied from the power supply device based on the power consumption of the electronic apparatus changed in accordance with the operation mode of the electronic apparatus.

9. The method according to claim 7, wherein the controlling includes giving the notification when power consumption of the electronic apparatus increases, and changing the operation mode of the electronic apparatus without giving the notification when power consumption of the electronic apparatus does not increase.

10. The method according to claim 7, wherein the connection unit is an interface complying with a universal serial bus (USB) power delivery (PD) standard, and the electronic apparatus can communicate with the power supply device by programmable power supply (PPS) of the USB PD standard.

11. The method according to claim 8, wherein the controlling includes estimating a time until a voltage of the power supplied from the power supply device transitions to a predetermined voltage after requesting the power supply device to change the power supplied from the power supply device, and displaying a duration of the notification.

12. The method according to claim 8, wherein the controlling includes ending the notification when a voltage of the power supplied from the power supply device reaches a predetermined voltage after requesting the power supply device to change the power supplied from the power supply device.

13. A non-transitory computer-readable storage medium storing a program for causing a computer to function as an electronic apparatus comprising:

a connection unit that connects to a power supply device; and a control unit that controls an operation of the electronic apparatus by power received from the power supply device; wherein when the power supplied from the power supply device is changed based on power consumption of the electronic apparatus, the control unit notifies user for a period until the power supplied from the power supply device is changed; and the control unit suspends change in an operation mode of the electronic apparatus until the power supplied from the power supply device is changed based on the power consumption of the electronic apparatus changed in accordance with the operation mode of the electronic apparatus, and gives the notification until the power supplied from the electronic apparatus is changed.

* * * * *